(12) United States Patent
Sloo et al.

(10) Patent No.: US 7,653,657 B2
(45) Date of Patent: Jan. 26, 2010

(54) STRATEGIES FOR DISCOVERING MEDIA RESOURCES

(75) Inventors: David H. Sloo, Menlo Park, CA (US); Michael A. Cleron, Menlo Park, CA (US); Jeffrey D. Yaksick, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 109 days.

(21) Appl. No.: 11/215,299

(22) Filed: Aug. 30, 2005

(65) Prior Publication Data

US 2007/0050408 A1 Mar. 1, 2007

(51) Int. Cl.
*G06F 17/00* (2006.01)
(52) U.S. Cl. .................. 707/104.1; 707/102; 707/101
(58) Field of Classification Search .............. 707/104.1, 707/102, 101
See application file for complete search history.

(56) References Cited

U.S. PATENT DOCUMENTS

| | | | | |
|---|---|---|---|---|
| 6,738,759 B1* | 5/2004 | Wheeler et al. | ................. | 707/3 |
| 7,191,469 B2* | 3/2007 | Erlingsson | .................... | 726/27 |
| 2003/0011637 A1* | 1/2003 | Boudier | ........................ | 345/771 |
| 2004/0148279 A1* | 7/2004 | Peleg | .......................... | 707/3 |
| 2005/0050438 A1* | 3/2005 | Cheung et al. | .............. | 715/500 |
| 2005/0097110 A1* | 5/2005 | Nishanov et al. | ............ | 707/100 |
| 2006/0069998 A1* | 3/2006 | Artman et al. | .............. | 715/721 |
| 2007/0110047 A1* | 5/2007 | Kim | .......................... | 370/389 |
| 2007/0130112 A1* | 6/2007 | Lin | ............................. | 707/2 |

* cited by examiner

*Primary Examiner*—Apu M Mofiz
*Assistant Examiner*—Thu Nga Nguyen
(74) *Attorney, Agent, or Firm*—Lee & Hayes, PLLC (57) ABSTRACT

Strategies are described for navigating through a database of media resources. The strategies present a user interface presentation that employs different display paradigms depending on the type of media resource being investigated. If the consumer is interrogating a media resource that has different associated "child" resources associated therewith, then a first kind of user interface presentation may be appropriate. If the consumer is interrogating a media resource that is a standalone resource having no child resources, then a second kind of user interface presentation may be appropriate. Still other kinds of display paradigms are possible.

10 Claims, 7 Drawing Sheets

STRATEGIES FOR DISCOVERING MEDIA RESOURCES

BACKGROUND

Advances in technology have allowed consumers to access ever-increasing collections of media resources (such as television programs, movies, music, and so forth). For example, it is becoming increasingly feasible to stream media information over a digital network (such as a wide area TCP/IP network) to a collection of set-top boxes located in the homes of consumers. Using such a system, the consumers can browse through potentially vast collections of media resources using an electronic program guide (EPG). In addition, or alternatively, the consumers can browse through large collections of video-on-demand (VOD) media resources.

However, these advances also present challenges. For example, a consumer may be pleased to have such a large collection of media resources at his or her disposal. But consumers are now faced with the potentially difficult task of interrogating the database to locate desired media resources. Such interrogation is referred to as "resource discovery" herein. The difficulty may arise because the consumer may need to browse through a large number of media resources before finding a desired resource. These operations may be time-consuming and cumbersome, and may detract from the consumer's otherwise positive experience in interacting with the system.

Figure 1A:
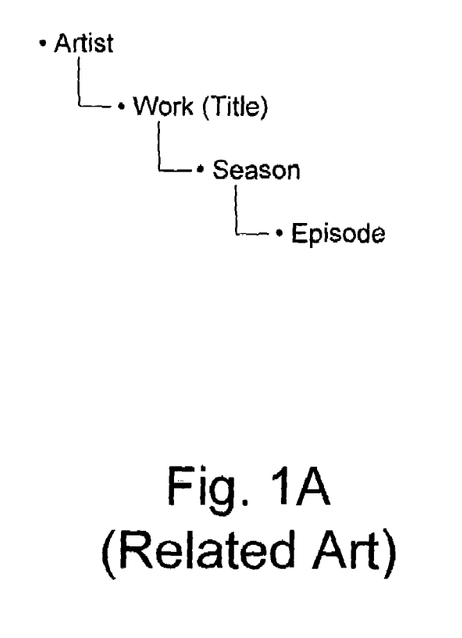
FIGS. 1A and 1B illustrate two approaches to discovering media resources that may suffer from one or more drawbacks.

Different systems adopt different approaches to allowing consumers to interrogate the contents of a database. Generally, television-related media resources may be organized using a hierarchical scheme. For example, FIG. 1A shows one technique for organizing such media resources. A top-level node of that hierarchy identifies an artist. The next level node defines various titles associated with this artist (such as various television programs that include the artist as a cast member). The next level node defines various seasons associated with the title. The next level node defines various episodes associated with a particular season. Other types of hierarchical organizations are possible. Thus, one approach to allowing a consumer to interrogate the contents of a database of TV programs is to adopt a hierarchical organization of media resources and allow the consumer to navigate through this hierarchical tree to find a desired resource. For example, one approach can present a user interface presentation which allows the consumer to select from a list of artists. Upon selecting an artist, another user interface presentation is presented, which allows the consumer to select from a list of titles associated with this artist. Upon selecting a title, another user interface presentation is presented, which allows the consumer to select from a plurality of available seasons. Upon selecting a season, another user interface presentation can be presented, which allows the consumer to select from a plurality of episodes.

However, this rigid approach to discovering assets may not apply well to some kinds of media resources. For example, as appreciated by the present inventors, a database may integrate different kinds of media resources together, and these resources may not all conform to the same kind of hierarchy. For example, consider the case in which a particular artist stars only in a handful of movies. It becomes rather artificial to ask the consumer to sequence through user interface pages directed to, say, season, when season is a category that does not apply to the movies. Further, as appreciated by the present inventors, a rigidly-applied discovery hierarchy may not be well suited for even some television programs. Consider, for example, the case in which a television program only lasts one season. The rigid approach to discovering resources may present a user interface presentation that only allows the consumer to select the single season, even though the consumer has no other options. As appreciated by the present inventors, this action therefore requires the consumer to perform a superfluous input operation.

Figure 1B:
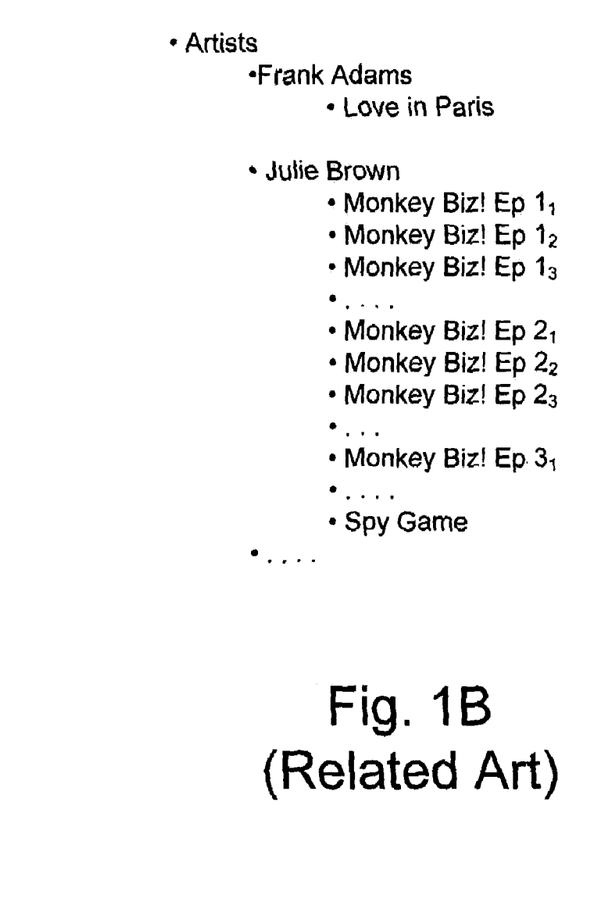

FIG. 1B represents an alternative to the rigid hierarchical approach described above. In this approach, the system provides a relatively flat list of media resources associated with each artist. For example, the hypothetical artist Frank Adams appears in only one movie called Love in Paris. On the other hand, the hypothetical artist Julie Brown appears in numerous episodes of a sitcom called Monkey Biz!, as well as a movie called Spy Game. These entries are presented in a single list without differentiating the nature of each entry (e.g., whether the entry corresponds to an episode of a TV program or a movie). This technique may reduce the grouping of resources into artificial categories. However, the consumer may find it difficult to pick a desired resource from such an interface, as the consumer may be presented with a very long list that may be cumbersome to navigate within.

Accordingly, as appreciated by the present inventors, this is need for a more consumer-friendly and intelligent approach to discovering media resources.

SUMMARY

Strategies are described herein for discovering media resources. According to one exemplary implementation, the strategies avoid applying a rigid hierarchy of media resources or a flat list of media resources. Instead, the strategies intelligently adapt the user interface presentation that is used to discover media resources based on the nature of the media resources being investigated. For example, in a first case, the media resources being investigated fit into a standard hierarchy. In this case, the strategies allow the consumer to navigate up and down within the hierarchy to find a desired media resource (or resources). In other cases, however, the media resources being investigated lack a hierarchical structure or have a minimal hierarchical structure (such as in the case where an artist only appears in one or more movies). In this case, the strategies allow a consumer to advance directly to a user interface presentation that features the media resources, without troubling the consumer by advancing through a number of hierarchical categories that do not apply to the media resources being investigated. More generally, the consumer can navigate through a collection of media resources of different types, and the strategies can dynamically adapt the manner of presenting the media resources to suit the nature of the scheme used to organize the resources.

According to another feature, even for media resources that lend themselves to hierarchical organization having multiple levels, the strategies determine whether any of the levels in the hierarchical organization fail to impart meaningful options to the consumer. If so, the strategies can eliminate these levels, thereby advancing the consumer directly to a lower level in the hierarchy. Consider the exemplary case in which the consumer wants to a find a certain episode of a sitcom that lasts only a single season. The strategies can eliminate the user interface presentation that allows the consumer to select among several seasons because, in fact, there is only one season to select from, and the consumer has no choice but to select this single season.

The strategies described above impart a number of benefits. According to one exemplary benefit, the consumer is presented with a meaningful sequence of user interface presentations that advance the consumer as directly as possible to the sought-after resource. This is performed by presenting a hierarchy of user interface presentations which matches the natural organization of the category of resource being investigated, and by collapsing superfluous levels of the hierarchy when appropriate. The consumer may find that this approach is more enjoyable and efficient than the strategies discussed in the Background section.

Still further features and attendant benefits of the strategies will be set forth below.

The subject matter set forth in this Summary section refers to exemplary manifestations of the invention, and hence does not limit the scope of the invention set forth in the Claims section. More specifically, the Claims section may set forth aspects of the invention which are broader in scope than the concepts described in this Summary section.

BRIEF DESCRIPTION OF THE DRAWINGS

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

In brief, the strategies provide an efficient technique for discovering media resources, presenting user interface presentations that are specifically tailored to the nature of the media resources being investigated.

As a preliminary matter, certain terms used in this description are defined below:

The term "media resource" refers to any kind of asset that can be presented to a consumer. Exemplary and nonlimiting types of resources include music, photographs, television programs, and so forth.

The term "media information" refers generally to the content of any kind of media resource.

The term "consumer" refers to any individual or automated agent which interacts with a media delivery system to receive media resources.

This disclosure includes the following sections. Section A presents an exemplary system for implementing the principles described herein. Section B describes an exemplary method of operation of the system of Section A. And Section C describes an exemplary computer environment for implementing aspects of the system of Section A.

A. Exemplary System

Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of Resource Discovery Design Paradigm

Figure 2:
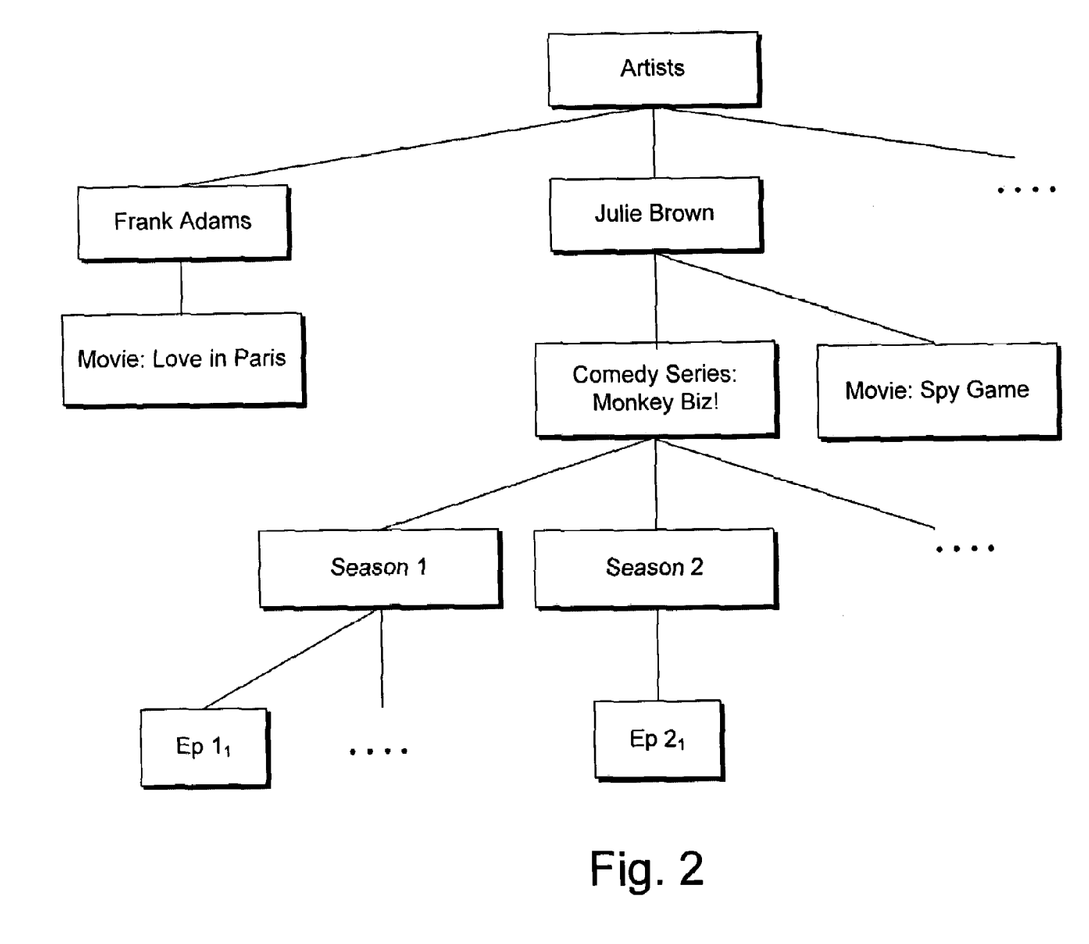
FIG. 2 shows an exemplary hierarchical ordering of media resources.

FIG. 2 shows a hierarchy 200 that will serve as the primary vehicle for explaining an improved approach to discovering media resources. In general, the hierarchy can represent a small excerpt of a more encompassing collection of media resources. Different levels in the hierarchy represent different gradations of detail. The media resources populate the hierarchy in a plurality of positions defined by nodes. A parent node defines a node which is coupled to one or more child nodes in a lower level of the hierarchy. Child nodes may serve the role of parent nodes with respect to their own child nodes.

In the illustrative example shown in FIG. 2, an artist level of the hierarchy includes at least two artists, the hypothetical Frank Adams and Julie Brown. The artist Frank Adams appears in only one movie called Love in Paris. Thus, the node in the hierarchy associated with Frank Adams has a single child node, representative of the movie Love in Paris. On the other hand, the hypothetical artist Julie Brown appears in numerous episodes of a sitcom called Monkey Biz!, as well as a movie called Spy Game. Thus, the node in the hierarchy associated with Julie Brown has a first child node representative of the sitcom Monkey Biz!, and another child node representative of the movie Spy Game. The node for Monkey Biz!, in turn, includes child nodes associated with the different seasons of the sitcom Monkey Biz!. Each season node, in turn, includes child nodes associated with different episodes that appear in the identified season. Note that the season node for season 2 only has a single episode, possibly indicating that the sitcom was canceled for some reason at the beginning of the season.

One goal of the resource delivery pardigm is to navigate within the hierarchy 200 shown in FIG. 2 in an intelligent manner, by presenting user interface presentations which explode out the media resources into multiple gradations where appropriate, but which do not impose multiple gradations where this is not appropriate in view of the media resource being investigated. For example, consider the case in which the consumer is investigating the titles associated with Frank Adams. Since Frank Adams appears in only one movie, the resource discovery paradigm directly advances the consumer to a user interface presentation that describes this single movie (without stepping through a series of categories that do not present any meaningful options to the consumer). On the other hand, consider the case in which the consumer is investigating the titles associated with Julie Brown. Julie Brown appears in both a sitcom and a movie, and the sitcom itself lends itself to a rich representation comprising different hierarchical levels. Accordingly, the resource discovery paradigm allows the consumer to navigate through a series of user interface presentations designed to expand the various media resources associated with the artist Julie Brown.

Further, according to another advantage, the resource discovery paradigm can collapse or coalesce parts of the hierarchy that do not convey meaningful options to the consumer. Consider the case with season 2 of the sitcom Monkey Biz!, which only has one episode. If the consumer selects season 2, then the resource discovery paradigm will not show the consumer a list having only one entry, but will rather advance the consumer into a user interface presentation dedicated to only the single episode.

A.2. System for Implementing the Design Paradigm

Figure 3:
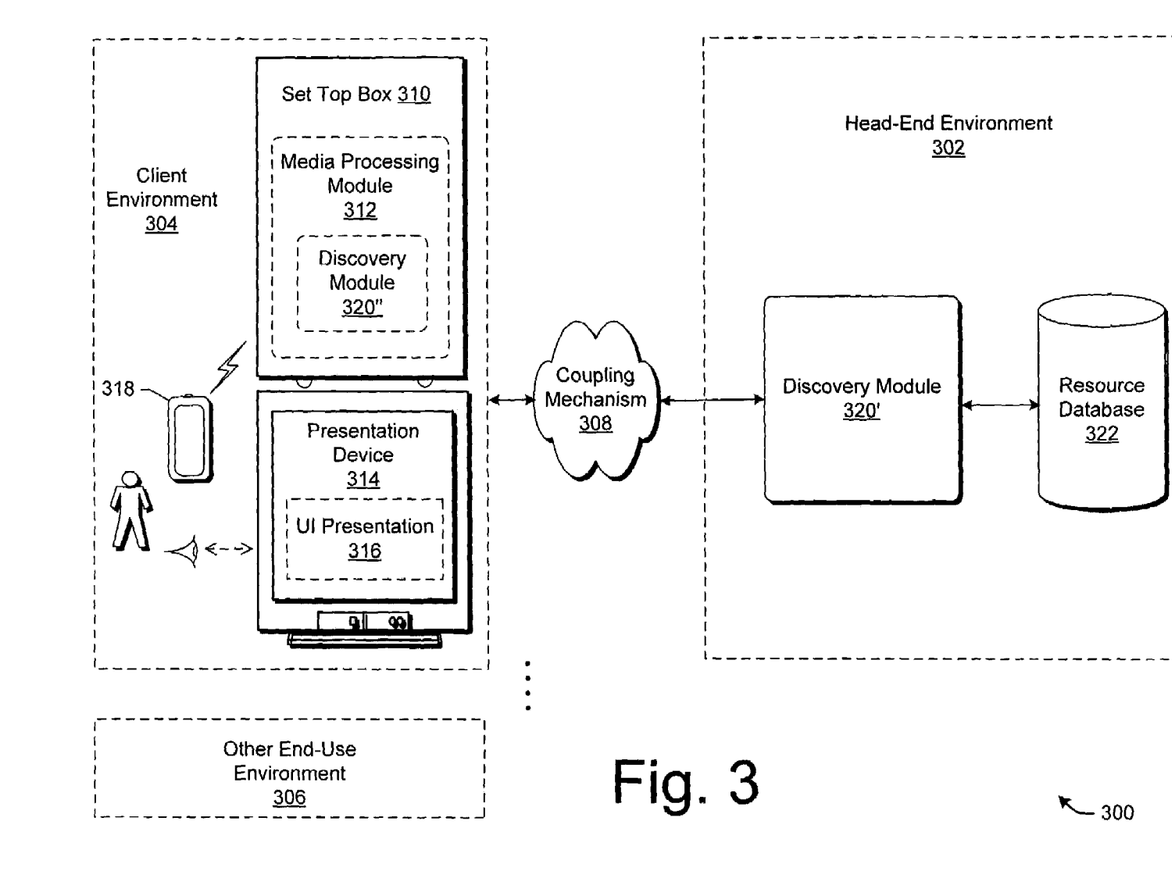
FIG. 3 shows a system that incorporates a new approach for discovering media resources, employing an intelligent selection of user interface presentations.

FIG. 3 shows one exemplary and non-limiting system 300 for implementing the above-described media resource delivery paradigm. The system 300 includes head-end infrastructure 302 for providing media information to a plurality of client devices in a plurality of client environments (304, . . . 306) via coupling mechanism 308. In one exemplary implementation, the system 300 is implemented as a digital network, where media information is disseminated from the head-end infrastructure 302 to the client environments (304, . . . 306) in digital form. For example, the media information can be coded according to any standard (such as, but not limited to, MPEG2), and packetized for dissemination to the client environments (304, . . . 306). The communication channel between the client environments (304, . . . 306) and the head-end environment 302 is two-way, meaning that the client environments (304, . . . 306) can send requests to the head-end environment 302 and receive data in response. The two-way channel can be implemented using different communication mechanisms for the uplink and downlink routes, or the same communication mechanism for both uplink and downlink routes.

Exemplary client environment 304 includes a client device in the form of set-top box 310. Other types of client devices can be used, such as personal video recorders, any kind of computer device, and so forth. The set-top box 310 includes a media processing module 312 for receiving media information from one or more sources, for processing this information, and for presenting the processed media information on a presentation device 314. The processing performed by the media processing module 312 can include tuning to one or more sources of media information (e.g., using one or more physical tuners or a "virtual" multicast and/or unicast tuners), decoding the media information, and so forth. One exemplary client device for receiving and decoding digital media information is described in co-pending and commonly assigned U.S. patent application Ser. No. 11/069,727, entitled, "TUNERLESS MEDIA PRESENTATION UNIT AND METHODS OF USE," naming inventors David L. de Heer et al., filed on Feb. 14, 2005, and incorporated by reference herein in its entirety.

The media processing module 312 can also provide a number of applications that do not process media information per se. For example, the media processing module 312 can provide electronic program guide (EPG) data that which shows available programming. In general, the media processing module 312 presents the output of these applications on a user interface presentation 316. The user interface presentation 316 overlays the entire screen of the presentation device 314, or a part thereof. A consumer can interact with the user interface presentation 316 via any kind of input device, such as remote control device 318.

Now turning the head-end environment 302, this environment 302 serves various functions related to the delivery of media information to the client environments (304, . . . 306). In a typical media distribution arrangement, for instance, the head-end environment 302 comprises various functionality which delivers television programs and/or video on demand (VOD) resources to the client environments (304, . . . 306). The media information can be delivered via the coupling mechanism 308, which may comprise a digital network (e.g., a TCP/IP WAN), cable routing infrastructure, satellite routing infrastructure, and so forth, or any combination thereof. The head-end environment 302 can include various other functionality associated with the delivery of media information, including a subscriber module, a billing module, and so forth. However, since these components are tangential to the primary focus of this disclosure, further discussion of these features is omitted herein.

A discovery module 320 interrogates the media resources. The discovery module 320 can be implemented in different ways. In one case, the logic for implementing the discovery module 320 can be implemented entirely at the head-end environment 302, in which case the discovery module is labeled as 320'. In another case, the logic for implementing the discovery module 320 can be entirely implemented at the client environment 304, in which case the discovery module is labeled as 320". In another case, the logic for implementing the discovery module 320 can be implemented in part by the head-end environment 302 and in part by the client environment 304. Reference to the discovery module 320 (without the qualifying superscripts) refers to any of the above-described implementations, or possibly some other kind of implementation.

In any case, the function of the discovery module 320 is to receive a request from the consumer regarding media resources, and, in response, to present information regarding the media resources to the consumer. The discovery module 320 performs this task by interrogating a resource database 322. The resource database 322 stores the media resources, or at least stores metadata and other information which reveals discoverable information regarding the media resources. The database 322 can be implemented using one or more physical stores (located at a single site or distributed over plural sites), in conjunction with any kind of database management logic.

The discovery module 320 implements the resource discovery paradigm introduced in subsection A.1. By virtue of this approach, the discovery module 320 displays user interface presentations that are best suited for the part of the hierarchical tree (shown in FIG. 2) that is being investigated at the moment. For instance, if the consumer is investigating a branch that has a sole leaf node, then the discovery module 320 advances directly to the leaf node and presents information associated with the sole media resource associated with that leaf node. If the consumer is investigating a part of the tree that has multiple branches, then the discovery module 320 will present a sequence of user interface presentations which step the consumer through the different levels of the tree.

Figure 4:
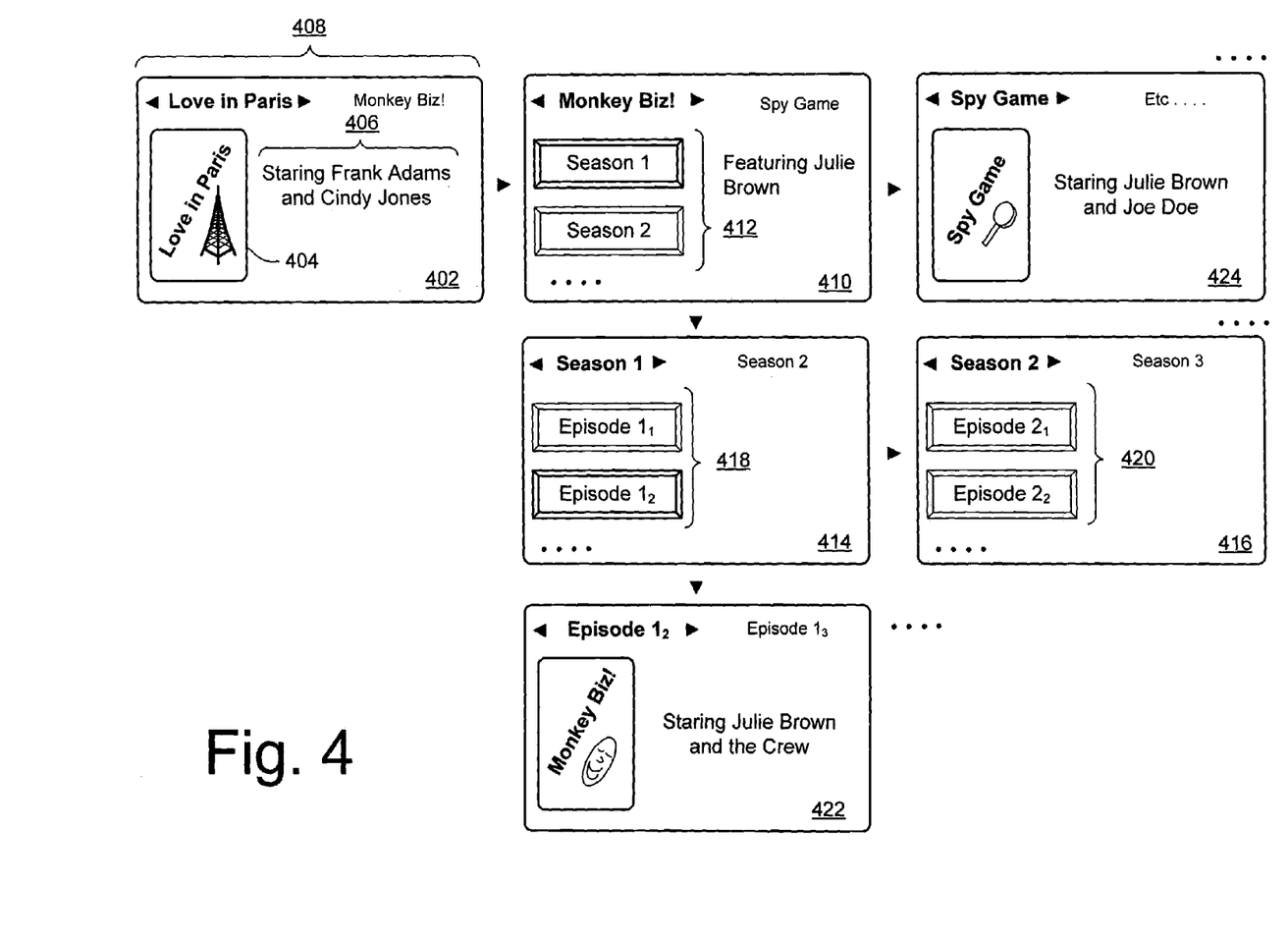
FIG. 4 shows an exemplary sequence of user interface presentations produced by the system of FIG. 3.

FIG. 4 shows an exemplary series of user interface presentations that the discovery module 320 can present. Assume in this specific and non-limiting scenario that the consumer begins by asking to review all of the resources associated with the artist Frank Adams. Since Frank Adams has only appeared in a single movie, Love in Paris, then the discovery module 320 advances directly to a user interface presentation 402 that presents targeted information regarding the movie Love in Paris. For example, the user interface presentation 402 may include a picture or audio vignette-loop 404 associated with the movie, as well as textual description 406 associated with the movie. This information (404, 406) allows the consumer to decide whether the he or she wishes to view this media resource (which the consumer may perform, for example, by clicking on the pictorial and/or textual presentations (404, 406)).

The user interface presentation 402 also includes navigation information 408 which allows the consumer to advance to a peer node within the hierarchical organization 200. For instance, the user interface presentation 402 alerts the consumer that a peer node corresponds to the sitcom Monkey Biz!. If the consumer activates this navigation option, then the discovery module 320 advances to the user interface presentation 410.

The user interface presentation 410 differs in kind from the user interface presentation 402. This is because the user interface presentation 402 is associated with a leaf node in the hierarchical organization 200, while the user interface presentation 410 is associated with a node that has child nodes associated therewith. Therefore, instead of advancing directly into a description of the details of a media resource, the user interface presentation 410 provides a series of commands 412 which allow the consumer to advance to the child nodes associated with the show Monkey Biz!. These child nodes happen to be season-related nodes, so the commands 412 allow the consumer to advance to the seasons associated with the show Monkey Biz! For instance, activating a Season 1 command invokes a user interface presentation 414 associated with season 1. The user interface presentation 414 provides commands associated with the episodes that appear in season 1 of Monkey Biz!. If the consumer activates a Season 2 navigation option within this user interface presentation 414, then the discovery module 320 invokes a user interface presentation 416. The user interface presentation 416 provides commands associated with the episodes that appear in season 2 of Monkey Biz! (in this case, season 2 has plural episodes, which differs from the scenario shown in FIG. 2, in which season 2 only has one episode).

Assume next that the consumer activates a command for Episode $1_2$ (which refers to the second episode of season 1) within the context of the user interface presentation 414. This action invokes the user interface presentation 422. The user interface presentation 422 presents detailed information regarding the selected episode ($1_2$), including, for instance, pictorial and textual content associated with the episode. Thus, this user interface presentation 422 is akin in nature to the first-mentioned user interface presentation 402, since both the user interface presentation 422 and the user interface presentation 402 represent respective leaf nodes in the hierarchical organization 200.

Finally, assume that the consumer activates the Spy Game movie option, featuring artist Julie Brown, from within the context of user interface presentation 410. This causes the discovery module 320 to present a user interface presentation 424. The user interface presentation 424 provides the details of the movie Spy Game. The movie Spy Game is again representative of a leaf node within the hierarchical organization 200. This means that the user interface presentation 424 is of the same type as user interface presentations 402 and 422.

In summary, the discovery module 320 can be said to employ different user interface paradigms for displaying information associated with nodes having different types. A first paradigm is used to display information associated with leaf nodes, resulting in the presentations 402, 422 and 424. A second paradigm is used to display information associated with child-bearing nodes, resulting in the presentations 410, 414 and 416. The use of two user interface presentations is merely exemplary. Other applications and hierarchical organization schemes might introduce more than two different kinds of node types, warranting the use of more than two different user interface paradigms. For example, different parts of the hierarchical ordering 200 may represent different hierarchical ordering schemes. The discovery module 320 tracks these different schemes by presenting a series of user interface presentations that are structured based on these schemes.

Figure 5:
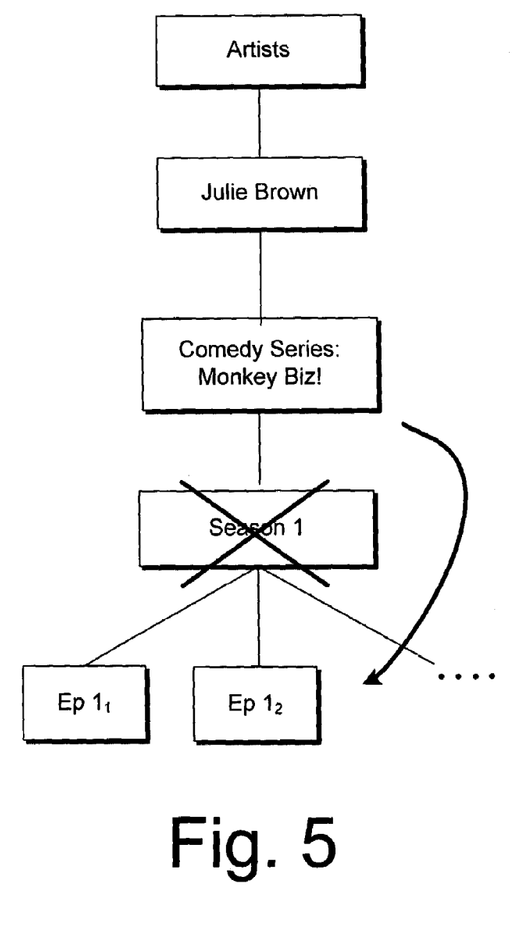
FIG. 5 shows an exemplary manner in which the system of FIG. 3 can coalesce nodes in a hierarchical ordering of media resources when one or more nodes in that ordering do not impart meaningful options to the consumer.

Advancing to FIG. 5, this figure illustrates another feature of the discovery module 320. More specifically, the scenario shown in this figure illustrates an alternative situation in which the sitcom Monkey Biz! only includes one season. In this case, the discovery module 320 can entirely eliminate the user interface 410 (shown in FIG. 1). This is because the consumer can only invoke season 1, there being no other option, thus making this page superfluous.

The same principle was discussed in the context of FIG. 2. In that case, the discovery module 320 can omit a user interface presentation akin to presentation 416 (of FIG. 4), because there is only one episode associated with season 2, giving the consumer no real option but to select this episode. Thus, if the consumer activates a command for season 2, then the discovery module 302 will advance the consumer directly into a leaf-node type user interface presentation associated with the sole episode.

This same concept can be applied throughout the hierarchy 200 to coalesce parts of the hierarchical tree that present non-meaningful information to the consumer. All of the above features result in a user interface presentation that dynamically changes its presentation strategy to suit the nature of the media resources being investigated. Through this dynamic mechanism, the consumer is exposed to the level of detail that they need to make appropriate decisions, without inundating the consumer with meaningless user interface presentations, or by simply presenting a flat list of items, in which it may be difficult to find desired items.

B. Exemplary Processes

Figure 6:
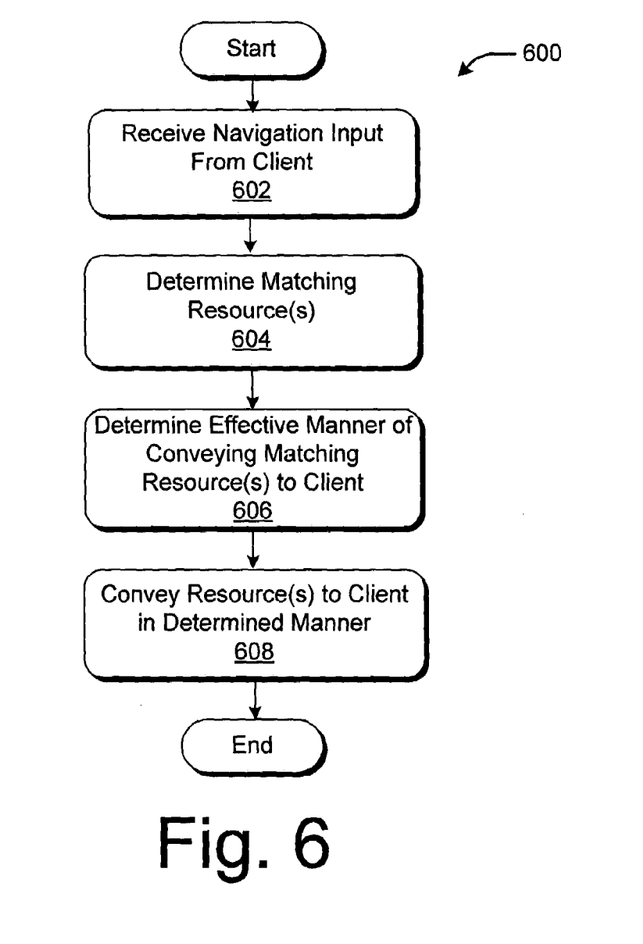
FIG. 6 shows an exemplary manner of operation of the system of FIG. 3.

FIG. 6 shows a procedure 600 that explains an exemplary manner of operation of the system 100 shown in FIG. 1. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. As the operations described in this flowchart have already been explained in the context of architecture of the system 100, this section will serve primarily as a review of those operations.

In step 602, the discovery module 320 receives a request that indicates that the consumer desires to investigate one or more resources stored in the resource database 322. For example, the consumer may enter such a request by interacting with the user interface presentation 316 of the presentation device 314 using the remote control device 318 or some other kind of input device.

In step 604, the discovery module 604 determines a node in the hierarchical organization 200 which matches the consumer's navigation instruction. For example, the consumer may enter a navigation instruction which can direct the consumer to any of the nodes within the hierarchical organization 200.

In step 606, the discovery module 320 determines an appropriate user interface presentation to display to the consumer, depending on the type of node that the consumer has "landed on." For instance, if the consumer lands on a leaf node, then the discovery module 320 may determine that the type of user interface presentations shown in presentations 402, 422 and 424 is appropriate. If the consumer lands on a child-bearing node, then the discovery module 320 may determine the type of user interface presentation shown in presentations 410, 414 and 416 is appropriate. Again, only two user interface presentation types were featured in FIG. 4, but more than two types can be employed.

In step 608, the discovery module 320 presents the media resources to the consumer in a manner determined by step 606.

C. Exemplary Computer Environment

Figure 7:
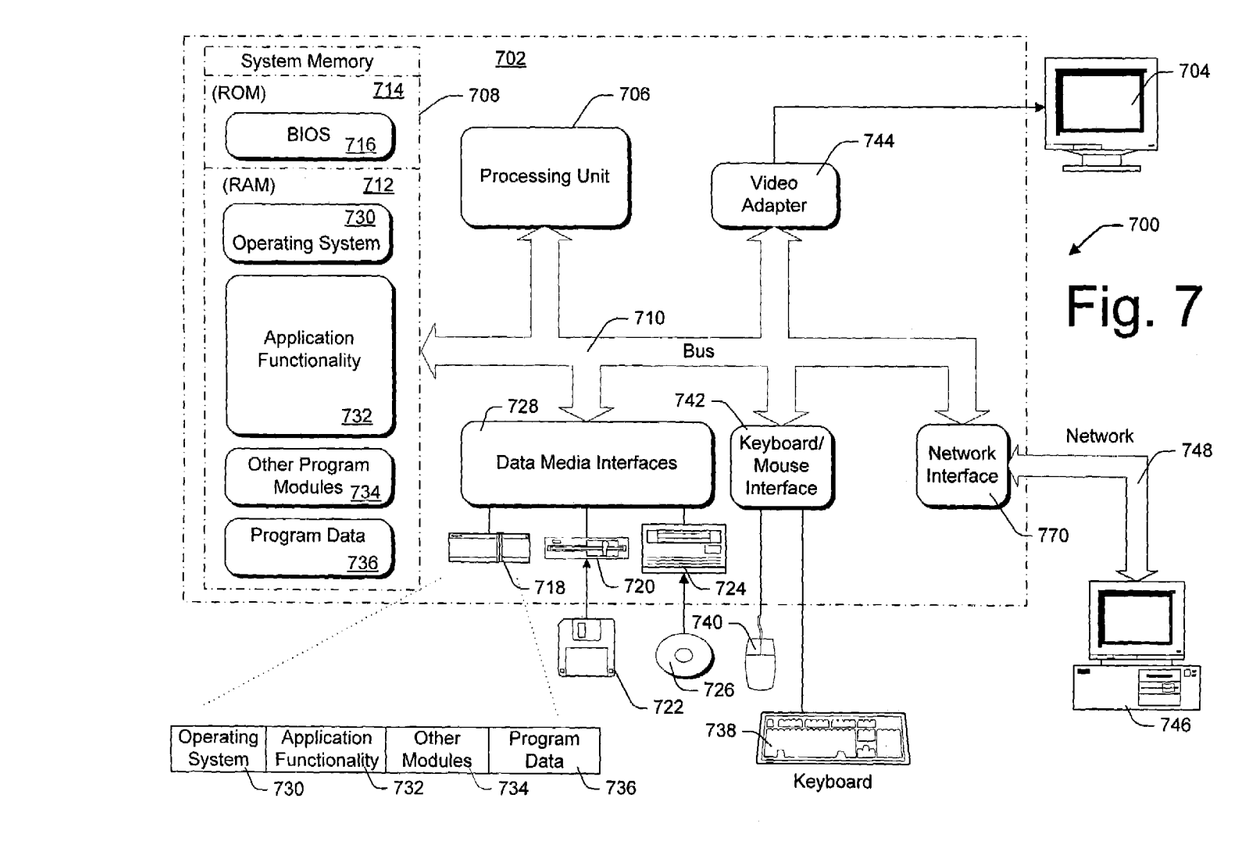
FIG. 7 shows an exemplary computer environment for implementing aspects of the system of FIG. 1.

FIG. 7 provides information regarding a computer environment 700 that can be used to implement any of the processing functions described in the proceeding sections, such as the discovery module 320, wherever this module is located.

The computing environment 700 includes a general purpose or sever type computer 702 and a display device 704. However, the computing environment 700 can include other kinds of computing equipment. For example, although not shown, the computer environment 700 can include hand-held or laptop devices, set top boxes, game consoles, mainframe computers, etc. Further, FIG. 7 shows elements of the computer environment 700 grouped together to facilitate discussion. However, the computing environment 700 can employ a distributed processing configuration. In a distributed computing environment, computing resources can be physically dispersed throughout the environment.

Exemplary computer 702 includes one or more processors or processing units 706, a system memory 708, and a bus 710. The bus 710 connects various system components together. For instance, the bus 710 connects the processor 706 to the system memory 708. The bus 710 can be implemented using any kind of bus structure or combination of bus structures, including a memory bus or memory controller, a peripheral bus, an accelerated graphics port, and a processor or local bus using any of a variety of bus architectures.

Computer 702 can also include a variety of computer readable media, including a variety of types of volatile and non-volatile media, each of which can be removable or non-removable. For example, system memory 708 includes computer readable media in the form of volatile memory, such as random access memory (RAM) 712, and non-volatile memory, such as read only memory (ROM) 714. ROM 714 includes an input/output system (BIOS) 716 that contains the basic routines that help to transfer information between elements within computer 702, such as during start-up. RAM 712 typically contains data and/or program modules in a form that can be quickly accessed by processing unit 706.

Other kinds of computer storage media include a hard disk drive 718 for reading from and writing to a non-removable, non-volatile magnetic media, a magnetic disk drive 720 for reading from and writing to a removable, non-volatile magnetic disk 722 (e.g., a "floppy disk"), and an optical disk drive 724 for reading from and/or writing to a removable, non-volatile optical disk 726 such as a CD-ROM, DVD-ROM, or other optical media. The hard disk drive 718, magnetic disk drive 720, and optical disk drive 724 are each connected to the system bus 710 by one or more data media interfaces 728. Alternatively, the hard disk drive 718, magnetic disk drive 720, and optical disk drive 724 can be connected to the system bus 710 by a SCSI interface (not shown), or other coupling mechanism. Although not shown, the computer 702 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 702. For instance, the readable media can store the operating system 730, application-specific functionality 732 (including functionality for implementing aspects of the resource discovery module 320), other program modules 734, and program data 736.

The computer environment 700 can include a variety of input devices. For instance, the computer environment 700 includes the keyboard 738 and a pointing device 740 (e.g., a "mouse") for entering commands and information into computer 702. The computer environment 700 can include other input devices (not illustrated), such as a microphone, joystick, game pad, satellite dish, serial port, scanner, card reading devices, digital or video camera, etc. Input/output interfaces 742 couple the input devices to the processing unit 706. More generally, input devices can be coupled to the computer 702 through any kind of interface and bus structures, such as a parallel port, serial port, game port, universal serial bus (USB) port, etc.

The computer environment 700 also includes the display device 704. A video adapter 744 couples the display device 704 to the bus 710. In addition to the display device 704, the computer environment 700 can include other output peripheral devices, such as speakers (not shown), a printer (not shown), etc.

Computer 702 operates in a networked environment using logical connections to one or more remote computers, such as a remote computing device 746. The remote computing device 746 can comprise any kind of computer equipment, including a general purpose personal computer, portable computer, a server, etc. Remote computing device 746 can include all of the features discussed above with respect to computer 702, or some subset thereof.

Any type of network 748 can be used to couple the computer 702 with remote computing device 746, such as the WAN 402 of FIG. 4, a LAN, etc. The computer 702 couples to the network 748 via network interface 750 (e.g., the interface 416 shown in FIG. 4), which can utilize broadband connectivity, modem connectivity, DSL connectivity, or other connection strategy. Although not illustrated, the computing environment 700 can provide wireless communication functionality for connecting computer 702 with remote computing device 746 (e.g., via modulated radio signals, modulated infrared signals, etc.).

In closing, a number of features were described herein by first identifying exemplary problems that these features can address. This manner of explication does not constitute an admission that others have appreciated and/or articulated the problems in the manner specified herein. Appreciation and articulation of the problems present in the relevant arts are to be understood as part of the present invention. More specifically, there is no admission herein that the features described in the Background section of this disclosure constitute prior art. Further, the description of a limited set of problems in the Background section does not limit the application of the invention to solving only those problems; it can be applied to problems and environments not expressly identified herein. Further, the subject matter set forth in the Summary section and the Abstract of this disclosure do not limit the subject matter set forth in the claims.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for discovering media resources, the method comprising:
   receiving at a computing device, a request from a client input device for information pertaining to one or more media resources;
   identifying by the computing device, a particular node for consideration (PNC) from a collection of media information associated with the requested information, the computing device being configured to facilitate identifying the PNC;
   determining if the PNC is a terminal node, a parent node with a single child, or a parent node with multiple children;
   based on the determination that the PNC is a parent node with a single child, detecting a branch of nodes, wherein:
      the branch of nodes begins with the PNC and advances down a hierarchy of nodes until finding a terminal node or a node with more than one child node,
      the branch of nodes having a last node that is either the terminal node or the node with more than one child node;
   classifying the PNC as a first node-type if the PNC is a terminal node or the detected branch of nodes ends in a terminal node;
      classifying the PNC as a second node-type if the PNC is linked to more than one child node or the last node in the detected branch of nodes has more than one child node;
      modifying a user interface presentation to be customized to a PNC, such that the media information is presented using a first presentation paradigm for the first node-type, and the media information is presented using a second presentation paradigm for the second node-type,
   wherein the first presentation paradigm provides the media information in a manner which emphasizes a single media resource related to the terminal node in the branch of nodes, such that the presentation paradigm will automatically advance over any number of levels in the hierarchy of nodes containing only one entry for selection and automatically select the terminal node in the branch of nodes, and
      wherein the second presentation paradigm provides the media information in a manner which lists plural media resources that are associated with the child nodes of the last node in the branch of nodes, such that the presentation paradigm will automatically advance over any number of levels in the hierarchy of nodes containing only one entry for selection.

2. The method of claim 1, wherein the first presentation paradigm emphasizes the single media resource by providing pictorial information associated with the single media resource.

3. The method of claim 1, wherein the second presentation paradigm lists the plural media resources in a manner such that the plural media resources can be selected to invoke user interface presentations associated with the respective child nodes.

4. The method of claim 1, wherein the hierarchical organization of media information includes:

a first node associated with an identified artist;
a second node associated with an identified title, which is associated with the identified artist;
a third node associated with an identified season, which is associated with the identified title; and
a fourth node associated with an identified episode, which is associated with the identified season.

5. One or more computer readable storage media comprising computer readable instructions for performing the method of:
   receiving at a computing device, a request from a client input device for information pertaining to one or more media resources;
   identifying by the computing device, a particular node for consideration (PNC) from a collection of media information associated with the requested information, the computing device being configured to facilitate identifying the PNC;
   determining if the PNC is a terminal node, a parent node with a single child, or a parent node with multiple children;
   based on the determination that the PNC is a parent node with a single child, detecting a branch of nodes, wherein:
      the branch of nodes begins with the PNC and advances down a hierarchy of nodes until finding a terminal node or a node with more than one child node,
      the branch of nodes having a last node that is either the terminal node or the node with more than one child node;
   classifying the PNC as a first node-type if the PNC is a terminal node or the detected branch of nodes ends in a terminal node;
   classifying the PNC as a second node-type if the PNC is linked to more than one child node or the last node in the detected branch of nodes has more than one child node;
   modifying a user interface presentation to be customized to a PNC, such that the media information is presented using a first presentation paradigm for the first node-type, and the media information is presented using a second presentation paradigm for the second node-type,
   wherein the first presentation paradigm provides the media information in a manner which emphasizes a single media resource related to the terminal node in the branch of nodes, such that the presentation paradigm will automatically advance over any number of levels in the hierarchy of nodes containing only one entry for selection and automatically select the terminal node in the branch of nodes, and
   wherein the second presentation paradigm provides the media information in a manner which lists plural media resources that are associated with the child nodes of the last node in the branch of nodes, such that the presentation paradigm will automatically advance over any number of levels in the hierarchy of nodes containing only one entry for selection.

6. A system comprising:
a processor;
a memory; and
a media processing module stored on the memory and executed by the processor, the media processing module comprising:
logic configured to receive a request for information pertaining to one or more media resources;
logic configured to identify by the computing device, a particular node for consideration (PNC) from a collection of media information associated with the requested information, the computing device being configured to facilitate identifying the PNC;

logic configured to determine if the PNC is a terminal node, a parent node with a single child, or a parent node with multiple children;

based on the determination that the PNC is a parent node with a single child, detecting a branch of nodes, wherein:
the branch of nodes begins with the PNC and advances down a hierarchy of nodes until finding a terminal node or a node with more than one child node,
the branch of nodes having a last node that is either the terminal node or the node with more than one child node;

classifying the PNC as a first node-type if the PNC is a terminal node or the detected branch of nodes ends in a terminal node;

classifying the PNC as a second node-type if the PNC is linked to more than one child node or the last node in the detected branch of nodes has more than one child node;

logic configured to modify a user interface presentation to be customized to a PNC, such that the media information is presented using a first presentation paradigm for the first node-type, and the media information is presented using a second presentation paradigm for the second node-type, wherein the first presentation paradigm provides the media information in a manner which emphasizes a single media resource related to the terminal node in the branch of nodes, such that the presentation paradigm will automatically advance over any number of levels in the containing only one entry for selection and automatically select the terminal node in the branch of nodes, and wherein the second presentation paradigm provides the media information in a manner which lists plural media resources that are associated with the child nodes of the last node in the branch of nodes, such that the presentation paradigm will automatically advance over any number of levels in the hierarchy of nodes containing only one entry for selection.

7. The system of claim 6, wherein the first type of node is a terminal node of a branch of the hierarchical organization.

8. The system of claim 7, wherein the first presentation paradigm causes the media information to be presented in a manner which emphasizes a single media resource.

9. The system of claim 6, wherein the second type of node comprises a node which is not a terminal node of a branch of the hierarchical organization.

10. The system of claim 9, wherein the second presentation paradigm causes the media information to be presented in a manner which lists plural media resources that are associated with child nodes of the node for consideration.

* * * * *